(12) United States Patent
Wu

(10) Patent No.: US 8,826,784 B2
(45) Date of Patent: Sep. 9, 2014

(54) AIRFOIL MACHINING METHOD AND CUTTING TOOLS

(75) Inventor: Chung Y. Wu, Middletown, CT (US)

(73) Assignee: United Technologies Corporation, Hartford, CT (US)

(*) Notice: Subject to any disclaimer, the term of this patent is extended or adjusted under 35 U.S.C. 154(b) by 496 days.

(21) Appl. No.: 13/219,872

(22) Filed: Aug. 29, 2011

(65) Prior Publication Data

US 2013/0051939 A1  Feb. 28, 2013

(51) Int. Cl.
*B23C 3/18* (2006.01)
*B23C 5/10* (2006.01)
*B26D 3/00* (2006.01)

(52) U.S. Cl.
CPC .............. *B23C 3/18* (2013.01); *B23C 2210/086* (2013.01); *B23C 2215/44* (2013.01); *B23C 5/10* (2013.01)
USPC .............................................. 82/46; 29/889.2

(58) Field of Classification Search
USPC ............ 407/53, 54, 61, 46; 409/84, 131, 132; 29/889.2
See application file for complete search history.

(56) References Cited

U.S. PATENT DOCUMENTS

| | | | | |
|---|---|---|---|---|
| 2,480,807 | A | * | 8/1949 | De Vlieg .......................... 409/84 |
| 2,633,776 | A | | 4/1953 | Schenk |
| 4,533,286 | A | * | 8/1985 | Kishi et al. ...................... 409/80 |
| 4,596,501 | A | * | 6/1986 | Wu ................................ 409/131 |
| 4,639,991 | A | * | 2/1987 | Sharon .......................... 29/889.7 |
| 5,014,421 | A | | 5/1991 | Swarden et al. |
| 5,197,191 | A | * | 3/1993 | Dunkman et al. ............ 29/889.1 |
| 5,618,222 | A | | 4/1997 | Baima et al. |
| 5,822,841 | A | * | 10/1998 | Bales et al. .................... 29/281.1 |
| 5,844,191 | A | | 12/1998 | Cox |
| 6,077,002 | A | * | 6/2000 | Lowe ............................. 409/132 |
| 6,918,716 | B2 | | 7/2005 | Berktold et al. |
| 7,101,263 | B2 | * | 9/2006 | Schwartz et al. ............... 451/56 |
| 7,771,141 | B2 | | 8/2010 | Sichi et al. |
| 7,836,594 | B2 | * | 11/2010 | Rose ............................. 29/889.1 |
| 7,841,809 | B2 | | 11/2010 | Engin |
| 2004/0033115 | A1 | * | 2/2004 | Sasu et al. ..................... 409/132 |
| 2008/0101877 | A1 | | 5/2008 | Engin |
| 2008/0206000 | A1 | * | 8/2008 | Sasu et al. ................... 407/29.13 |
| 2009/0246032 | A1 | | 10/2009 | Stone et al. |
| 2013/0000121 | A1 | * | 1/2013 | Burgess ..................... 29/889.23 |

FOREIGN PATENT DOCUMENTS

DE  305999  6/1918
GB  753233  7/1956

OTHER PUBLICATIONS

EP Search Report dated Dec. 11, 2012.

* cited by examiner

*Primary Examiner* — Will Fridie, Jr.
(74) *Attorney, Agent, or Firm* — Carlson, Gaskey & Olds, P.C.

(57) ABSTRACT

A method of machining an airfoil includes the steps of providing first and second cutting tools respectively having first and second cutting contours that are different than one another. A blank is cut with the first cutting tool to provide a first airfoil surface on a first blade. The blank is cut with the second cutting tool to provide a second airfoil surface on a second blade. An airfoil is produced having the first and second blades. A cutting tool for machining the airfoil includes a shank. A cutting surface adjoins the shank and provides a cutting contour corresponding to an airfoil surface. The cutting surface extends along a cutting length axially from a nose to near a cutting boundary. The cutting length is configured to be greater than the blade length.

10 Claims, 3 Drawing Sheets

AIRFOIL MACHINING METHOD AND CUTTING TOOLS

BACKGROUND

This disclosure relates to a method of machining airfoils, such as integrally bladed rotors (IBR), for gas turbine engine applications, for example. This disclosure also relates to cutting tools for use during machining IBRs.

IBRs are used in some gas turbine engine applications and are provided by a unitary structure that includes a hub from which circumferentially arranged blades radially extend. In order to produce an IBR, material from between the blades must be removed during a complex machining process. Typically, multiple passes of a cutting tool along a complex cutting path is used to form each airfoil surface.

In one example, a relatively short cutting tool, or quill, having a straight-edge conical cutting contour is used to grind material from between the blades. The tool is relatively short and its cutting axis is generally parallel to a rotational axis of the IBR. The cutting tool moves along a path that extends along a length of the blade.

SUMMARY

A method of machining an airfoil includes the steps of providing first and second cutting tools respectively having first and second cutting contours that are different than one another. A blank is cut with the first cutting tool to provide a first airfoil surface on a first blade. The blank is cut with the second cutting tool to provide a second airfoil surface on a second blade. An airfoil is produced having the first and second blades.

A cutting tool for machining an airfoil includes a shank. A cutting surface adjoins the shank and provides a cutting contour corresponding to an airfoil surface. The cutting surface extends along a cutting length axially from a nose to near a cutting boundary. The cutting length is configured to be greater than the blade length.

BRIEF DESCRIPTION OF THE DRAWINGS

The disclosure can be further understood by reference to the following detailed description when considered in connection with the accompanying drawings wherein.

DETAILED DESCRIPTION

Figure 1:
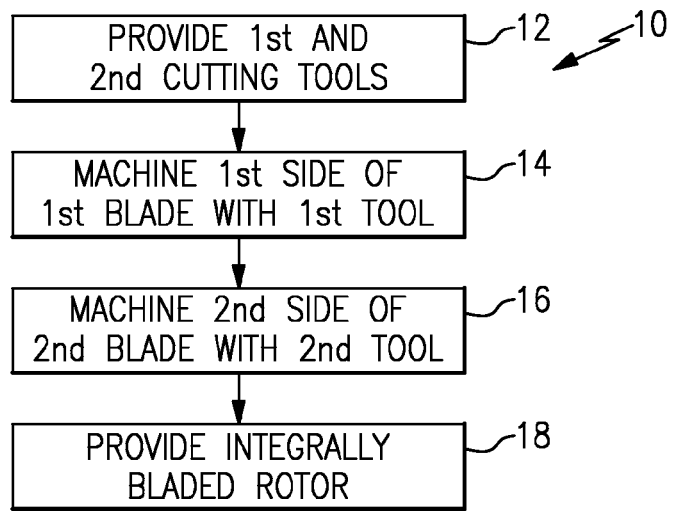
FIG. 1 is a flowchart depicting an example method of machining an integrally bladed rotor.

A method of machining an airfoil, such as an integrally bladed rotor (IBR), is illustrated generally at 10 in FIG. 1. It should be understood that the method may also be used to machine individual, discrete airfoils. Generally, the disclosed cutting tools include long, complex cutting contours enabling each airfoil surface to be machined in a single pass, for example. A cutting surface of the cutting tools extends from the blade root to the blade tip. In one example, the cutting tool enters one side of an IBR blank and moves along a path until it exits the other side of the IBR blank. Once the cutting tool exits the other side, the airfoil surface is formed such that the airfoil surface is finished and no additional material removal is required.

The cutting contours are mathematically designed based upon the airfoil surface to be cut. Straight-edge conical surfaces cannot accomplish a single pass cut of an airfoil surface. Each cutting tool contour is specific to each airfoil surface. That is, one cutting tool is used to cut the suction side of the blade, and another cutting tool is used to cut the pressure side of the blade.

With continuing reference to FIG. 1, the method 10 includes providing first and second cutting tools, as indicated at block 12, for a CNC machine. The cutting tools may be milling tools, having flutes, or a super-abrasive machining (SAM) tools, for example. Milling is typically used with titanium materials, and SAM is typically used with other materials such as nickel. The SAM tools grind the material away from between the blades of the blank.

The first side of a first blade is machined with a first tool, as indicated at block 14. The first tool, for example, is used to machine a pressure side of a first blade. All of the pressure sides of the array of blades on the IBR may be machined successively, if desired, to reduce cutting tool changes. The CNC machine changes between cutting tools, and a second side of a second blade is machined with a second tool, as indicated at block 16. The second side may correspond to a suction side of a blade. All of the second sides of the blades may be machined successively. A large volume of cutting fluid is used during the machining operation to maintain temperatures below a desired threshold. A fully machined IBR is provided, as indicated at block 18.

Figure 2:
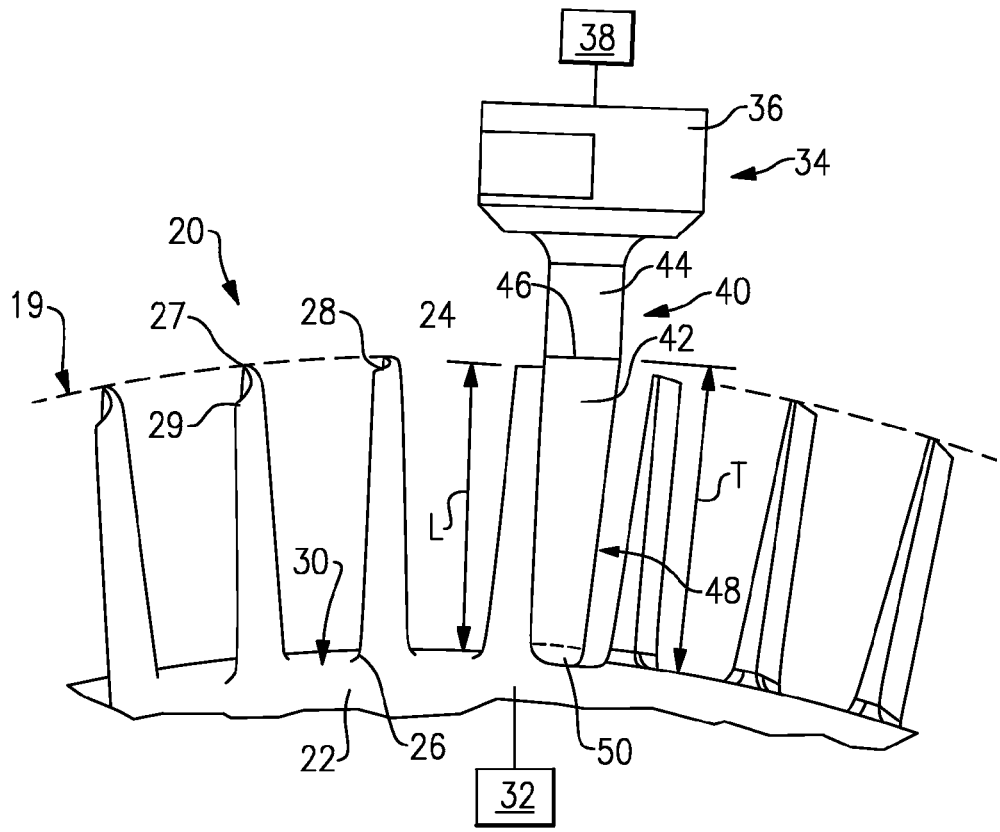
FIG. 2 is a schematic view of the blades of an integrally bladed rotor being cut with a cutting tool.

Referring to FIG. 2, the IBR 20 is cut from a blank 19, which is illustrated schematically. The IBR 20 includes a hub 22 having an array of blades 24 extending radially from the hub 22. Each blade 24 includes a root 26 adjoining the hub 22 and extending to a tip 28. The blades 24 have a blade length L extending radially from a platform 30 between adjoining blades and their tip 28. The blade 24 provides an airfoil surface having pressure and suction sides 52, 54 (see FIGS. 3A and 3B, respectively) spaced apart from one another and extending between leading and trailing edges 27, 29. A single cutting pass extends between the leading and trailing edges 27, 29. The IBR 20 is machined from the blank 19 such that the blades 24 and hub 22 are provided as a one piece, unitary structure.

A cutting tool 40 is secured to a chuck 36 of a tool assembly 34. The chuck 36 is rotationally driven by a motor of a CNC machine 38, for example, which is capable of moving the cutting tool 40 along a path in multiple axes. The blank 19 is held in a fixture 32 during machining that may index the blank 19 relative to the tool assembly 34. Alternatively or additionally, the chuck 36 may move along the cutting path relative to the blank 19.

The cutting tool 40 includes a shank 44 received in the chuck 36, and a cutting surface 42 used for flank machining adjoins the shank 44 at a cutting boundary 46. The cutting surface 42 provides a cutting contour 48 that is mathematically determined based upon the airfoil surface geometry of the blade to be machined. Typically, the more complex the airfoil surface, the more complex the cutting contour will be.

The cutting surface 42 extends from a nose 50 at a tip of the cutting tool 40, which cuts the platform 30, to the cutting boundary 46. The length form the nose 50 to the cutting boundary 50 corresponds to a cutting length T. The cutting length T is greater than the blade length L, which enables the corresponding airfoil surface to be cut in a single pass.

Figure 3A:
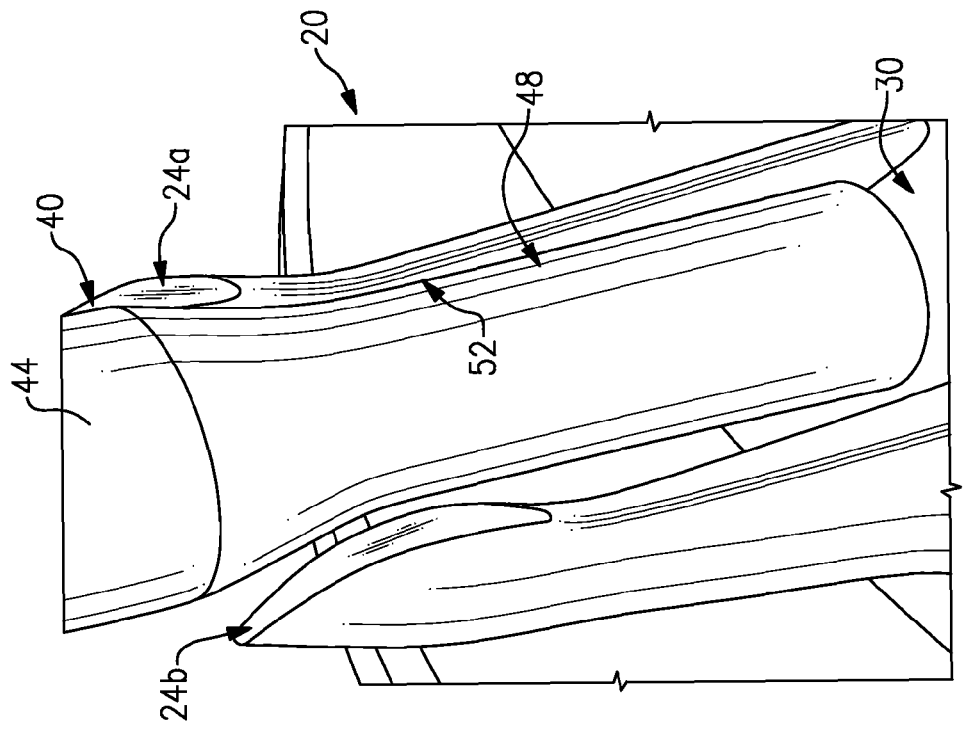
FIG. 3A illustrates a first cutting tool cutting a first airfoil surface on a first blade.
Figure 3B:
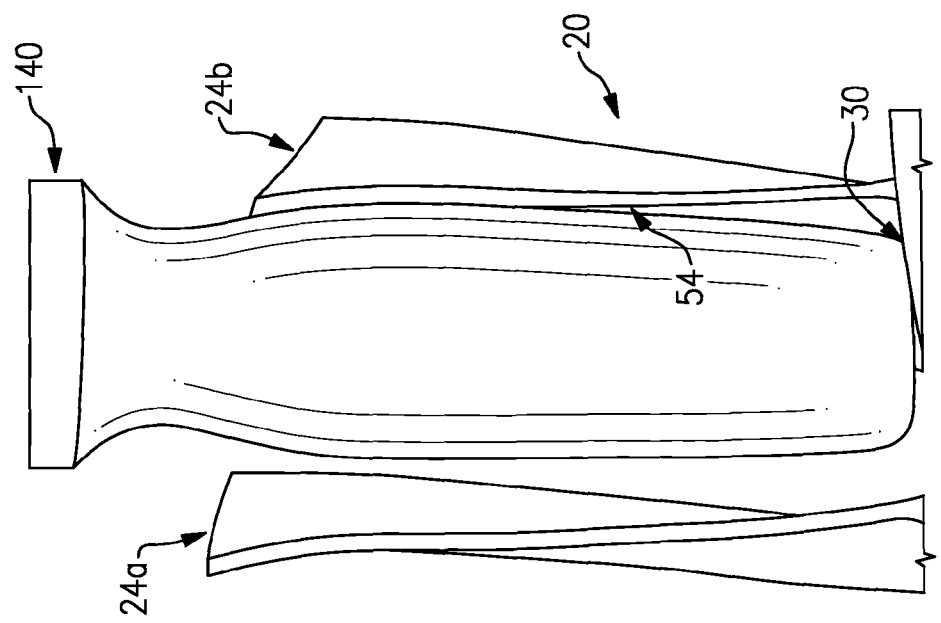
FIG. 3B illustrates a second cutting tool cutting a second airfoil surface on a second blade.

Referring to FIGS. 3A and 3B, the adjoining blades 24A, 24B include a first and second airfoil surfaces 52, 54, which corresponds to pressure and suction sides of the blades. The first and second airfoil surfaces 52, 54 face one another. One cutting tool 40 is dedicated to cutting first airfoil surfaces 52 of the array of blades, while the second cutting tool 140 is dedicated to cutting the second airfoil surfaces 54 of the array of blades. In this manner, each of the tools 40, 140 are designed to machine an airfoil surface in a single pass.

Figure 4B:
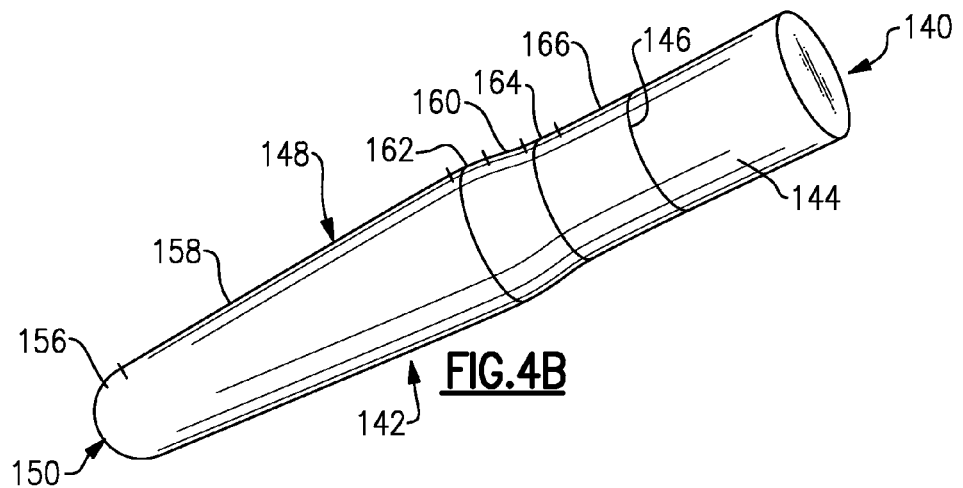
FIG. 4B depicts another second cutting tool.
Figure 4A:
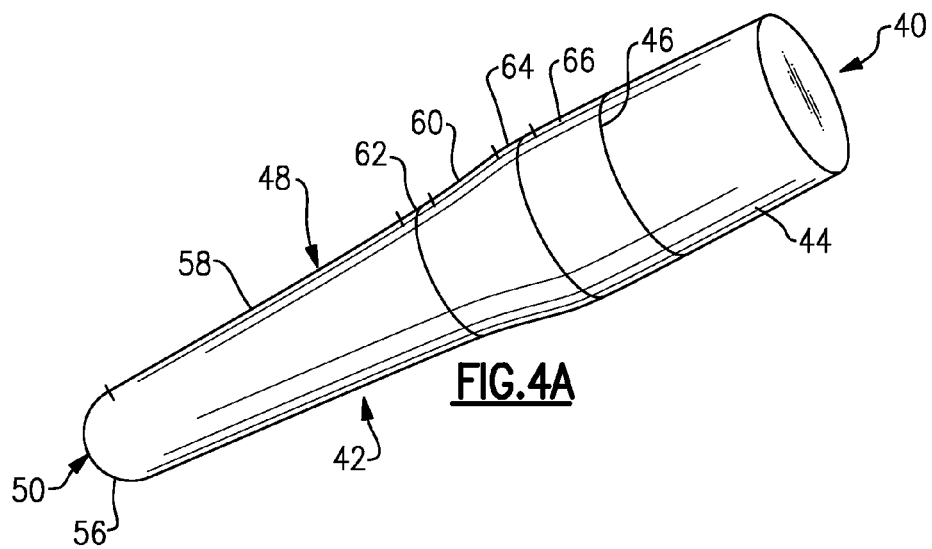
FIG. 4A depicts another first cutting tool.
Figure 5:
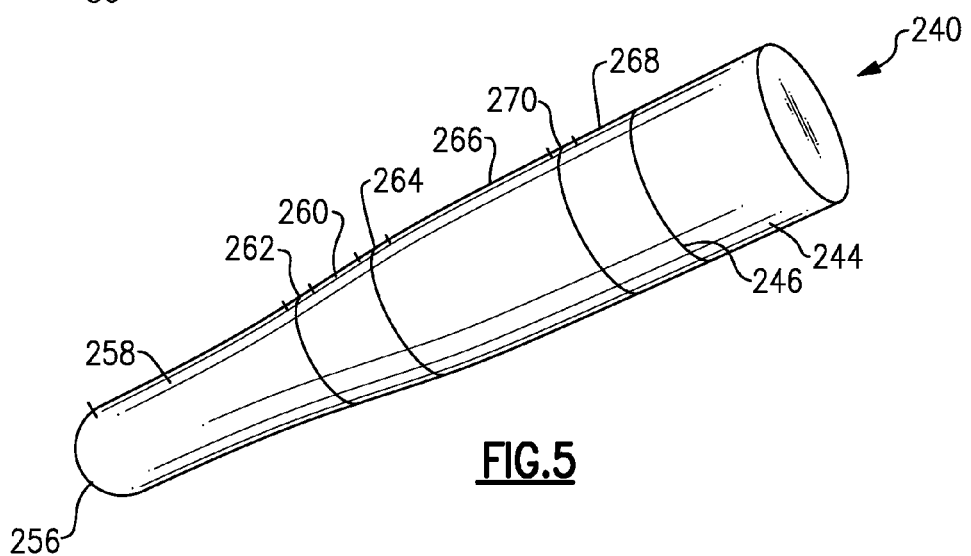
FIG. 5 depicts another example cutting tool.

Referring to FIG. 4A, the cutting tool 40 is illustrated in more detail. The cutting tool 40 includes adjoining first, second, third and fourth cutting sections 56, 58, 60, 66 that are respectively joined to one another by first and second transitional cutting surfaces 62, 64. Referring to FIG. 4B, the cutting tool 140 includes adjoining first, second, third and fourth cutting sections 156, 158, 160, 166 that are respectively joined to one another by first and second transitional cutting surfaces 162, 164. The cutting sections and transitional cutting surface may be comprised of one or more splines to provide the desired cutting contour.

The cutting tools 40, 140 have cutting surfaces 42, 142 adjoining their shanks 44, 144 and providing a cutting contour 48, 148 corresponding to an airfoil surface (e.g., pressure and suction sides 52, 54). The cutting surfaces 42, 142 extend a cutting length axially from their nose 50, 150 to near their respective cutting boundary 46, 146. Each cutting surface 42, 142 has an irregular conical shape, i.e. a non-straight edge cutting surface, provided by multiple adjoining non-linear cutting sections between the nose and the cutting boundary.

Referring to the first cutting tool 40 in FIG. 4A, a non-linear cutting section 66 adjoins the cutting boundary 46 and is convex and configured to align with a blade tip 28 during the cutting operation. Referring to the second cutting tool 140 in FIG. 4B, a non-linear cutting section 166 adjoins the cutting boundary 146 and is concave and configured to align with a blade tip 28 during the cutting operation. The noses 50, 150 are configured to align with a blade root 26 during the cutting operations.

For more complex airfoil surfaces, a more complex cutting contour may be used. For example, referring to FIG. 4C, the cutting tool 240 includes adjoining first, second, third, fourth and fifth cutting sections 256, 258, 260, 266, 268 that are respectively joined to one another by first, second and third transitional cutting surfaces 262, 264, 270. In the example, the fifth cutting section 268 adjoins the cutting boundary 246 at the shank 244, and the first cutting section. Thus, the cutting contour of the cutting tool has a significantly different profile than a conical cutting tool.

Although an example embodiment has been disclosed, a worker of ordinary skill in this art would recognize that certain modifications would come within the scope of the claims. For that reason, the following claims should be studied to determine their true scope and content.

What is claimed is:

1. A method of machining an airfoil comprising the steps of:
   providing first and second cutting tools respectively having first and second cutting contours that are different than one another;
   cutting a blank with the first cutting tool to provide a first airfoil surface on a first blade;
   cutting the blank with the second cutting tool to provide a second airfoil surface on a second blade; and
   producing an airfoil having the first and second blades.

2. The method according to claim 1, wherein the blank provides an integrally bladed rotor having a hub with the first and second blades integral with and extending radially from the hub, the integrally bladed rotor providing a unitary structure.

3. The method according to claim 2, wherein the first and second blades are adjacent to one another, and the first and second airfoil surfaces face one another.

4. The method according to claim 2, wherein the first and second blades each extend from a root at the hub to a tip providing a blade length, and the first and second cutting tools each include a cutting length corresponding to a cutting surface engaging its respective airfoil surface, the cutting length greater than the blade length.

5. The method according to claim 4, wherein the first and second cutting tool each include a cutting section overlapping the tip, the first cutting tool cutting section generally annularly concave-shaped, and the second cutting tool cutting section generally annularly convex-shaped, the first airfoil surface corresponding to a suction side of the first blade, and the second airfoil surface corresponding to a pressure side of the second blade.

6. The method according to claim 5, wherein the first and second airfoil surfaces are formed in a single cutting pass respectively by the first and second cutting tool.

7. The method according to claim 6, wherein the single pass extends between leading and trailing edges of the first and second blades.

8. The method according to claim 1, wherein the first and second cutting tools are milling cutting tools, and the cutting steps are milling operations.

9. The method according to claim 1, wherein the first and second cutting tools are super-abrasive cutting tools, and the cutting steps are grinding operations.

10. The method according to claim 1, wherein the first and second airfoil surfaces are finished surfaces requiring no additional material removal.

* * * * *